United States Patent [19]

Magnusson

[11] Patent Number: 5,562,824
[45] Date of Patent: Oct. 8, 1996

[54] GRAVITY WATER PURIFIER

[75] Inventor: Jan H. Magnusson, Mahtomedi, Minn.

[73] Assignee: WTC/Ecomaster Corporation, Minneapolis, Minn.

[21] Appl. No.: 321,977

[22] Filed: Oct. 12, 1994

[51] Int. Cl.⁶ .................................. B01D 24/12
[52] U.S. Cl. .................... 210/266; 210/282; 210/283; 210/284; 210/285; 210/286; 210/290; 210/455; 210/470; 210/472; 210/474; 210/476; 210/482
[58] Field of Search ................. 210/266, 282, 210/283, 284, 285, 286, 287, 288, 289, 290, 291, 501, 455, 464, 465, 466, 467, 468, 469, 470, 472, 473, 474, 475, 476, 477, 482, 209

[56] References Cited

U.S. PATENT DOCUMENTS

| | | | |
|---|---|---|---|
| 1,157,776 | 10/1915 | Hagg | 210/266 |
| 1,521,100 | 12/1924 | House | 210/266 |
| 1,579,158 | 3/1926 | Smilie | 210/266 |
| 1,621,684 | 3/1927 | Rabjohn et al. | 210/266 |
| 1,629,269 | 5/1927 | Hagg | 210/266 |
| 1,674,203 | 6/1928 | Holz et al. | 210/266 |
| 1,723,564 | 8/1929 | Lewis | 210/501 |
| 1,806,977 | 5/1931 | Kenney | 210/266 |
| 2,017,456 | 10/1935 | Gudmundsen | 210/501 |
| 2,335,458 | 11/1943 | Senyal | 210/122 |
| 2,372,340 | 3/1945 | Senyal | 210/101 |
| 4,024,991 | 5/1977 | Tyson et al. | 210/474 |
| 4,074,986 | 2/1978 | Frahm et al. | 210/474 |
| 4,145,291 | 3/1979 | Console et al. | 210/474 |
| 4,322,291 | 3/1982 | Ho | 210/287 |
| 4,382,862 | 5/1983 | Dillman | 210/668 |
| 4,419,235 | 12/1983 | Sway | 210/282 |
| 4,642,192 | 2/1987 | Heskett | 210/638 |
| 4,769,143 | 9/1988 | Deutsch et al. | 210/266 |
| 4,995,975 | 2/1991 | Jacquot et al. | 210/282 |
| 4,995,976 | 2/1991 | Vermes et al. | 210/266 |
| 4,999,109 | 3/1991 | Sabre | 210/501 |
| 5,076,922 | 12/1991 | DeAre | 210/282 |
| 5,122,274 | 6/1992 | Heskett | 210/638 |
| 5,126,044 | 6/1992 | Magnusson et al. | 210/282 |
| 5,128,036 | 7/1992 | Svensson | 210/282 |
| 5,135,654 | 8/1992 | Heskett | 210/638 |
| 5,173,192 | 12/1992 | Shalev | 210/282 |
| 5,200,070 | 4/1993 | McMenamin | 210/282 |
| 5,211,973 | 5/1993 | Nohren, Jr. | 210/266 |
| 5,269,919 | 12/1993 | von Medlin | 210/282 |
| 5,273,649 | 12/1993 | Magnusson et al. | 210/232 |
| 5,273,650 | 12/1993 | Vermes et al. | 210/282 |
| 5,308,482 | 5/1994 | Mead | 210/207 |
| 5,328,609 | 7/1994 | Magnusson et al. | 210/282 |
| 5,401,399 | 3/1995 | Magnusson et al. | 210/136 |
| 5,405,526 | 4/1995 | Sutera | 210/266 |
| 5,431,813 | 7/1995 | Daniels | 210/477 |

Primary Examiner—Cynthia L. Nessler
Attorney, Agent, or Firm—D. L. Tschida

[57] ABSTRACT

A gravity percolation water purifier assembly. The assembly includes a covered storage container having a dispensing spigot. A flanged filtration chamber is supported beneath the cover to receive untreated water. A porous filter cartridge is sealed to an outlet port. A purifier cartridge is threaded to the outlet port and supports multiple fibrous spacers and treatment chambers containing beds of treatment media, including a multi-valent iodine media, granular activated carbon, and a halogen scavenger media. In one purification cartridge, water passes from multiple inlet ports at an inlet bore through adjoining concentric chambers and to the storage container via outlet ports at the periphery of the purifier cartridge.

16 Claims, 7 Drawing Sheets

GRAVITY WATER PURIFIER

BACKGROUND OF THE INVENTION

The present invention relates to gravity fed water treatment systems and, in particular, to a countertop, multi-chambered assembly for filtering and purifying contaminated water of pathogens.

A common appliance found in many households around the world is a water filtration assembly. Such assemblies exist in many constructions and types. Each is used to treat drinking water for contaminants which may be contained in available water. In some circumstances, the water may be drawn from personal wells, cisterns and the like. Where the water is made available from a municipal supplier, the treatment assembly may be used to treat the water for residual contaminants.

A typical gravity percolation treatment assembly provides a treatment chamber, which receives untreated water, and a containment or storage chamber, which stores the treated water. Treatment principally comprises a filtering of contaminants through a porous filter media that is supported between the chambers. A spigot or other valve assembly at the storage chamber permits a controlled draw down of the treated water. Such containers are commonly constructed of clay or terra-cotta materials. The containers are molded into multiple sections. The sections typically stack mount to one another. The treatment section can be configured to include a chamber to contain the filtration media.

One known treatment assembly provides stacked clay or terra-cotta chambers. A filter cartridge having a porous ceramic housing contains a granular activated carbon (GXC) material and depends from a treatment chamber into the storage chamber. The clay chambers, however, are not readily manufactured, are heavy and susceptible to breakage in use or during shipping, and are difficult to clean. The opaque walls also prevent viewing the available supply of filtered water to assure necessary periodic re-filling and an adequate supply of drinking water.

U.S. Pat. No. 903,070 discloses another stacked, molded clay treatment assembly. A separate sponge filter and particulate filter mount within the treatment and storage chambers. Multiple layers of fine granular stone and charcoal filter the water as it feeds to the storage chamber.

Another known assembly provides a covered plastic container and within which are suspended a treatment chamber and a depending treatment cartridge. The treatment chamber receives and directs untreated water to the attached treatment cartridge which contains a single media bed. The media bed provides a mixture including iodine, granular activated carbon (GAC) and other materials to filter the water. A bacteriostatic material is included to control the growth of bacteria, fungus, mold and algae.

A perceived deficiency of the foregoing assembly is that the media mixture has a relatively short storage life. The cartridge is also believed susceptible to leakage of iodine vapors, which over time discolor the container walls.

A variety of plastic dispensing pitchers are also known which provide multiple chambers and support replaceable filtration cartridges.

Although gravity filtration assemblies of the foregoing types remove many undesired materials such as chlorine, various metals (e.g. iron, copper, lead, manganese, and aluminum), and control bacteria at the filter, the filtrates are ineffective against many pathogens that may be found within untreated water. Desirably, any treatment assembly should include a bactericide purification media. The purification media should remove varieties of parasites, bacterial, and viral pathogens and chemical contaminants. The assembly should also treat the water to remove any taste effecting residuals which may be added to the water from the purification media. The treatment media should have a relatively long storage or shelf life and any supporting cartridge should prevent the escape of halogen vapors. The container construction should also lend itself to low cost manufacture, be durable and provide transparent walls.

The present invention was developed in appreciation of the foregoing deficiencies and preferred attributes and provides an aesthetically appealing, multi-chambered, gravity percolation, treatment assembly for household use. The assembly readily mounts on a counter or table top and includes replaceable filtration and purifier cartridges. The cartridges seal and thread mount to the treatment chamber and direct admitted water between the treatment chamber and a surrounding collection chamber.

SUMMARY OF THE INVENTION

It is accordingly a primary object of the present invention to provide a gravity percolation, water treatment assembly which supports a purifier cartridge that contains a halogen media.

It is a further object of the invention to provide a water treatment assembly which contains separate filter and purifier cartridges.

It is a further object of the invention to provide an assembly having a transparent, molded plastic filtration chamber, which stacks internally of a transparent storage container.

It is a further object of the invention to provide a fiber filter cartridge which is sealed to the filtration chamber and a purifier cartridge which depends from the filtration chamber into an adjoining storage chamber.

It is a further object of the invention to provide a light weight, storage container which accomodates filling and access to the contained filtration chamber and filtration and purification cartridges, permits controlled draw down, is not susceptible to breakage or spillage, and is aesthetically appealing.

It is a further object of the invention to provide a purifier cartridge which includes multiple GAC media beds; media for removing metals and chlorine; a halogen based bactericide media to treat parasites, bacterial and viral pathogens and chemical contaminants found in the water; and a scavenger media for removing halogen residuals.

It is a further object of the invention to provide a purifier cartridge which prevents the escape of halogen vapors and discoloration of the storage container walls.

It is a further object of the invention to provide a purifier cartridge having concentrically arranged chambers that contain a multi-valent iodine, a bacteriostat, and halogen scavenger medias and which are separated by GAC media beds and fiber spacers.

It is a further object of the invention to provide a purifier cartridge having a bore which couples to a nozzle of the filtration chamber and a fan folded, fiber filter which separately press fits to the filtration chamber.

Various of the foregoing objects, advantages and distinctions of the invention are found in a presently preferred assembly that provides covered filtration and storage chambers. Flanged edges of a conical filtration chamber are supported at a threaded rim of a transparent, molded plastic storage container. A spigot projects from the storage container and a cover retains the internal filtration chamber and filtration and purification cartridges to the storage container. Venting protrusions and bores at the flanged edges and rim vent the filtration chamber and storage container.

O'ring seals retain an outlet nozzle of a fan folded filter cartridge to a threaded nozzle of the filtration chamber. A purifier cartridge screws to the nozzle of the filtration chamber and is suspended into the storage chamber. Multiple beds of treatment media are sequentially and/or concentrically arranged within the purifier cartridge. Admitted water percolates from the filtration chamber through the filter and purifier cartridges to collect within the storage container.

A bore of the purification cartridge includes a bacteriostat and/or a GAC filtrate media and a halogen based purification media (i.e. a multi-valent iodine), which collectively devitalizes and filters the water of parasites, bacterial and viral pathogens, metals and chemical contaminants. A concentric chamber exposed at the sidewalls of the bore contains a second GAC particulate and a halogen scavenger media which removes residuals of the active halogen media that might be contained in the treated water. Fiber spacers separate the various active treatment media from one another and prevent leakage of iodine gases that can cause potential container discoloration.

Still other objects, advantages and distinctions of the invention will become more apparent from the following detailed description with respect to the appended drawings. To the extent modifications and improvements have been considered, they are described as appropriate. The description should not be literally construed in limitation of the invention. Rather, the scope of the invention should be interpreted from the further appended claims.

DESCRIPTION OF THE PREFERRED EMBODIMENT

Figure 1:
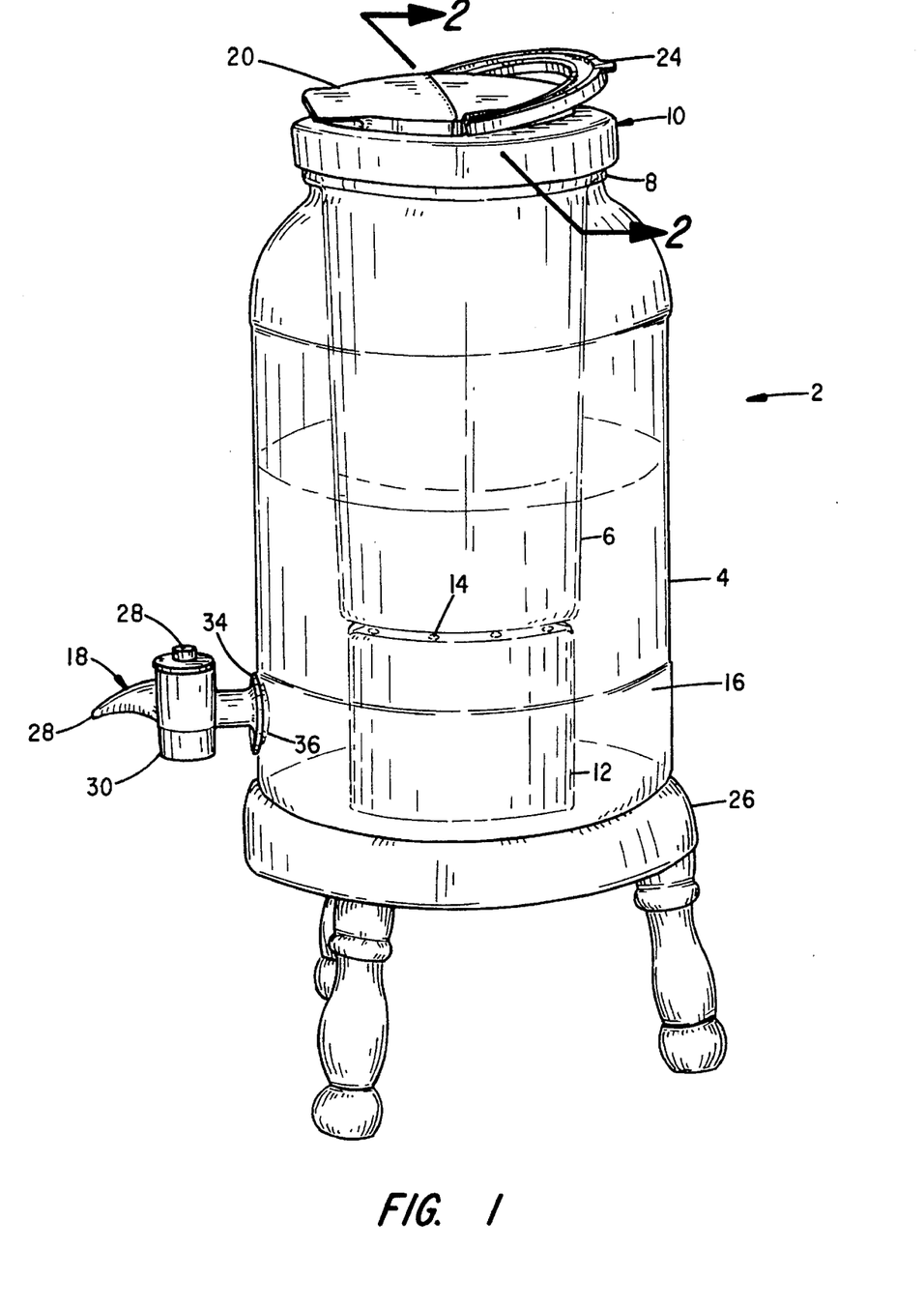
FIG. 1 is a perspective drawing of a gravity percolation purifier assembly of the invention.

With attention to FIG. 1, a perspective drawing is shown of a gravity percolation water purification assembly 2. The assembly 2 includes a transparent, multi-chambered water storage container 4. A filtration chamber 6 is suspended internally from a threaded rim 8 and beneath a mating cover 10. A bactericide containing purification cartridge 12 depends from the treatment chamber 6. A number of outlet ports 14, admit water from the cartridge 12 to a containment or storage chamber 16 of the container 4. Treated water is retained in the chamber 16 until dispensed from a spigot 18 which projects from a sidewall of the container 4.

Untreated water is admitted to the filtration chamber 6 upon removing the cover 10 or through a hinged fill cap 20. The water percolates through a fan folded filter 22, reference FIG. 2, mounted within the treatment chamber 6 and the purification cartridge 12.

A carry handle 24 is also provided at the cover 10. The handle folds flat to the cover 10 when not in use. The handle can also support the assembly 2 from a wall hanger (not shown).

The container 4 is constructed of a molded, transparent styrene plastic. A user is thus able to visually determine an available quantity of drinking water and gauge the condition and percolation rate of the replaceable filter 22 and purification cartridge 12. The container 4 can be constructed of a variety of other water impermeable materials and to a variety of alternative configurations. As desired, the cover 10 may include, or not, the cap 20 or handle 24.

Depending upon the quantity of water required, the container 4 and treatment chamber 6 can be constructed to a variety of sizes. For normal household use, the container 4 is sized to a gross volume of water in the range of 1 to 5 gallons which is sufficient to accommodate normal daily drinking needs and provide sufficient time with each periodic refilling of the treatment chamber 6 to permit percolation of purified water into the storage chamber 16.

A pedestal 26 supports the container 4 on a counter or a table top within a user household. The pedestal 26 conveniently elevates the spigot 18 to permit dispensing of treated water. A tray at the base of the legs or a concave recess in the top of the pedestal 26 (not shown) may be provided at the pedestal 26 to catch condensation which may form and drip from the external walls of the container 4.

A pedestal 26 may not be required, such as where the container 4 is supported from a wall hanger or is directly supported on a counter and the spigot 18 projects over an adjacent sink or space where a drinking glass or cup can be held. The container 4 can also be formed to include feet or mate with a separate tray. A variety of other container and support constructions are also possible. Any derived assembly 2 should provide a stable and aesthetically pleasing appearance.

The spigot 18 includes a flow control valve 26 and a finger support 28 that projects from a valve body 30. Intermediate seals or flanges 34, 36 provide a liquid tight coupling of the spigot 18 to the container 4. The spigot 18 can be adhesively or sonically bonded to the container 4. A threaded end 32, reference FIG. 2, can also be provided to mate with a threaded flange 36.

Figure 2:
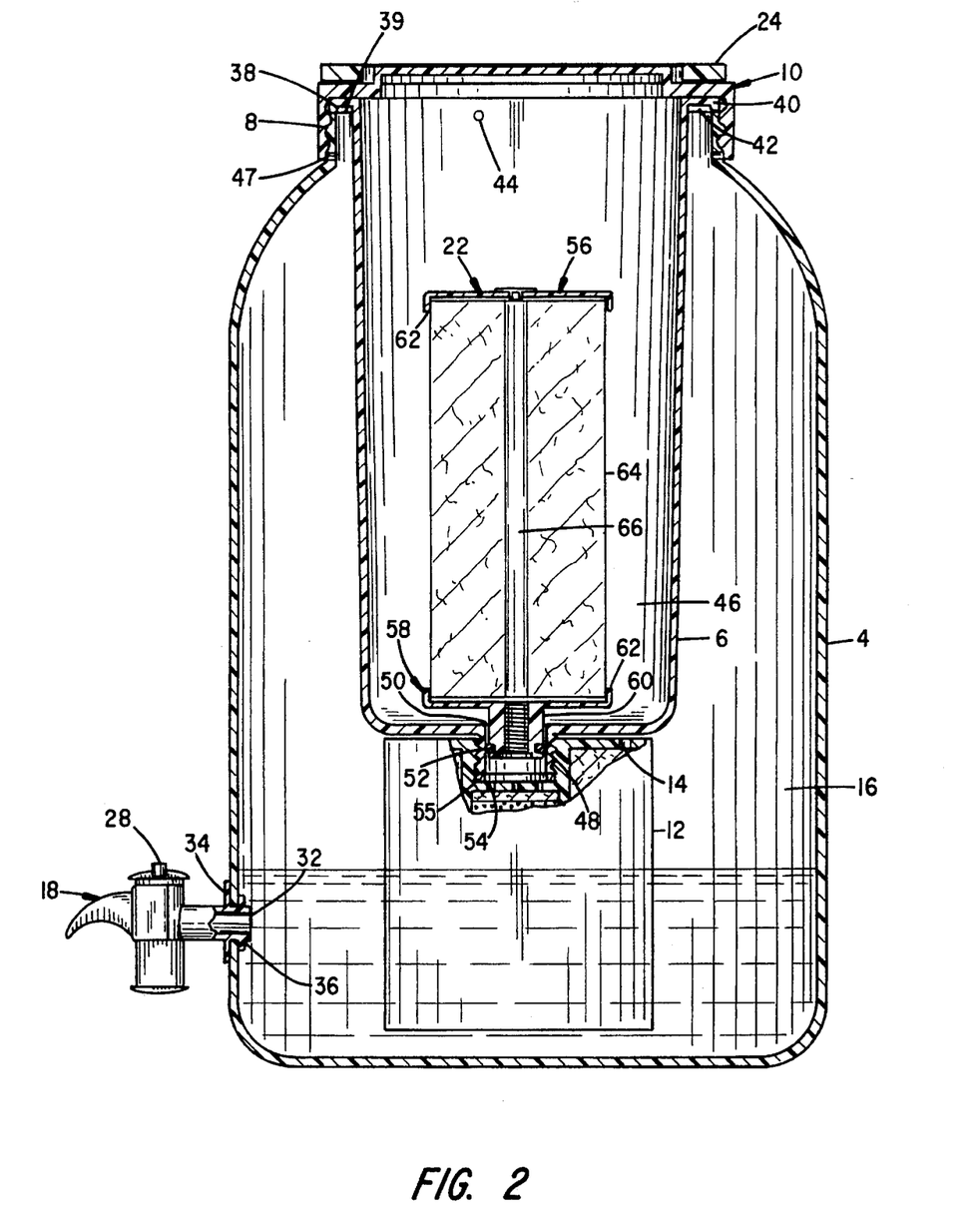
FIG. 2 is a cross section drawing taken along section lines 2—2 of FIG. 1 of the gravity purifier assembly and wherein details of the fitting of a fiber filter and a purification cartridge are shown in partial cutaway.

With attention to FIG. 2, the filtration chamber 6 is supported at a peripheral flange 38 to the rim 8. A series of circumferentially displaced projections 40 protrude from the lower surface of the flange 38 to space the filtration chamber 6 above the uppermost edge 39 of the rim 8 and create a series of air gaps 42. The air gaps 42 cooperate with the loose fitting threads of the cover 10 and rim 8 to vent the interior storage chamber 16 of the container 4 and filtration space 46 of the filtration chamber 6.

The projections 40 may also be included on the upper surface of the flange 38 to separate the chamber 6 from the cover 10 and create a second series of air gaps (not shown). One or more holes 44 may alternatively be formed through the walls of the filtration chamber 6 and/or at the flange 38 to vent the filtration space 46.

Depending upon the seal created between the threads of the cover 10 and rim 8, one or more holes 47 might also be formed in the rim 8 to enhance the venting. Preferably, sufficient venting is obtained to assure a free flow of water through the filter 22, purification cartridge 12 and from the spigot 18.

With the removal of the cover 10, the filtration space 46 is completely exposed to permit filling the treatment chamber 6 from a household faucet tap or other water source. Alternatively, the cap 20 can be hinged open to permit filling. The filter 22 is also exposed and can be replaced or cleaned as desired.

The filter 22 is retained to an outlet port or nozzle 48 that projects from the bottom of the chamber 6. A nozzle 60 of the filter 22 is press fit and sealed to a bore 50 of the nozzle 48 with an O'ring seal 52. The filter 22 can thus be removed without removing the chamber 6, upon withdrawing the filter from the nozzle 48 and through the exposed rim 8. Alternatively, the filtration chamber 6 can be removed to permit access to the filter 22.

With the removal of the filtration chamber 6 from the container 4, the purification cartridge 12 is also accessible for separate replacement. The walls of the assembly 2 may also be cleaned, as necessary, on such occasions.

The purification cartridge 12 depends from the filtration chamber at threads 54 of the nozzle 48. A washer or seal 55, mounts between the nozzle 48 and cartridge 12 to seal the bore 50. The filter 22 and cartridge 12 can be changed together or separately as necessary in relation to their nominal working life and water conditions.

With attention next to FIGS. 2–7 specific details of the filtration and purification cartridges of the assembly 2 are apparent. FIG. 2 depicts the filter cartridge 22 which provides a pair of flanged end caps 56 and 58. The end cap 56 provides a flat outer surface and the end cap 58 provides a nozzle 60 which supports the O'ring seal 52. A flanged peripheral edge 62 of each end cap 56, 58 projects to support a fan folded filter media 64 between the end caps 56, 58. The media is glued to the end caps 56, 58. A center bore 66 extends through the media 64 and end cap 58 to the nozzle 60, which receives and directs water that passes through the media 64 into the bore 50 and the cartridge 12.

As presently constructed, a paper filtrate media 64 having a porosity in the range of 20 to 50 microns is included and is sized to provide approximately 2 to 5 square feet of filter surface. The filter 22 has a nominal life of 100 gallons. Other porous fiber filtrates may be used instead.

Figure 3:
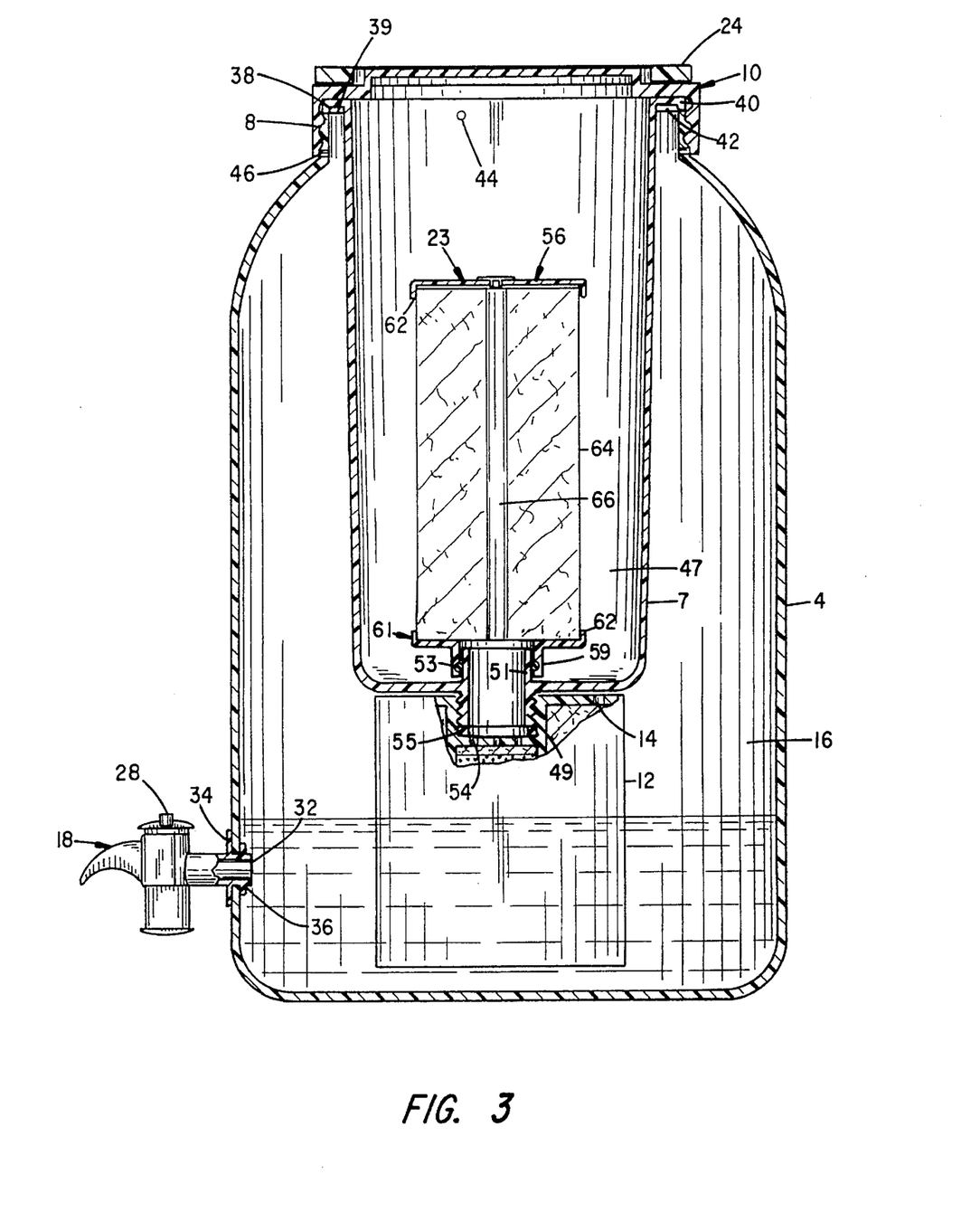
FIG. 3 is a cross section drawing similar to FIG. 2 and including an alternative filter cartridge mounting.

FIG. 3 depicts an alternative cartridge filter 23 that is press fit to an alternative filtration chamber 7. The chamber 7 includes a depending nozzle 49 and an upright nozzle 51 that projects into a filtration space 47. The filter 23 is constructed in essentially the same fashion as the filter 22. A bored nozzle 59 of an endcap 61, is constructed to press fit about the nozzle 51. An O'ring seal 53 seals the filter 23 to the chamber 7.

A variety of filtrate media can be used to filter suspended contaminants from the water. Although a porous fiber or paper media is presently preferred, a variety of other media, for example, granular GAC, cast GAC, filter paper, felt or other fiberous media might be substituted, provided the media offers a desired porosity and can be adequately supported to a cartridge housing. If a granular media is used, the endcaps 56, 58 and 56, 61 would be constructucted as part of a molded housing (not shown) to contain the granular media. Fibrous and granular or solid cast media might also be incorporated into a cartridge that includes multiple types of exposed and contained filtrates.

FIGS. 4 through 7 depict details to alternative purification cartridges 70, 71, 72 and 73 that might be used with the assembly 2. Each respectively provides a molded plastic housing 74, 75, 76 and 77 and contain multiple beds of treatment media. The media of the cartridges 70, 71 and 72 are concentrically arranged about a threaded center bore. The cartridge 73 provides axially aligned media beds. Threads 53 retain each cartridge to the nozzle 48 and secure adjacent inlet ports 82 to receive the filtered water. The housings 74, 75 include a bottom cover 78 and the housings 76, 77 include a top cover 80. The covers 78, 80 can be sonically welded or bonded with suitable adhesives. The outlet ports 14 are exposed through the covers 78, 80.

The inlet ports 82 at the bores 84, 85, 85 and 87 of the housings 74, 75, 76 and 77 direct water from the filter 22 into the cartridges 70 to 73 and which exits at the outlet ports 14. Water exits at the cartridges 70 and 71 from the top and at the cartridges 72 and 73 from the bottom. The treated water is received in the storage container 4, where it is isolated from the untreated water in the filtration chamber 6 via the O'ring seals 52, washer 55 and threaded nozzle 48.

Figure 4:
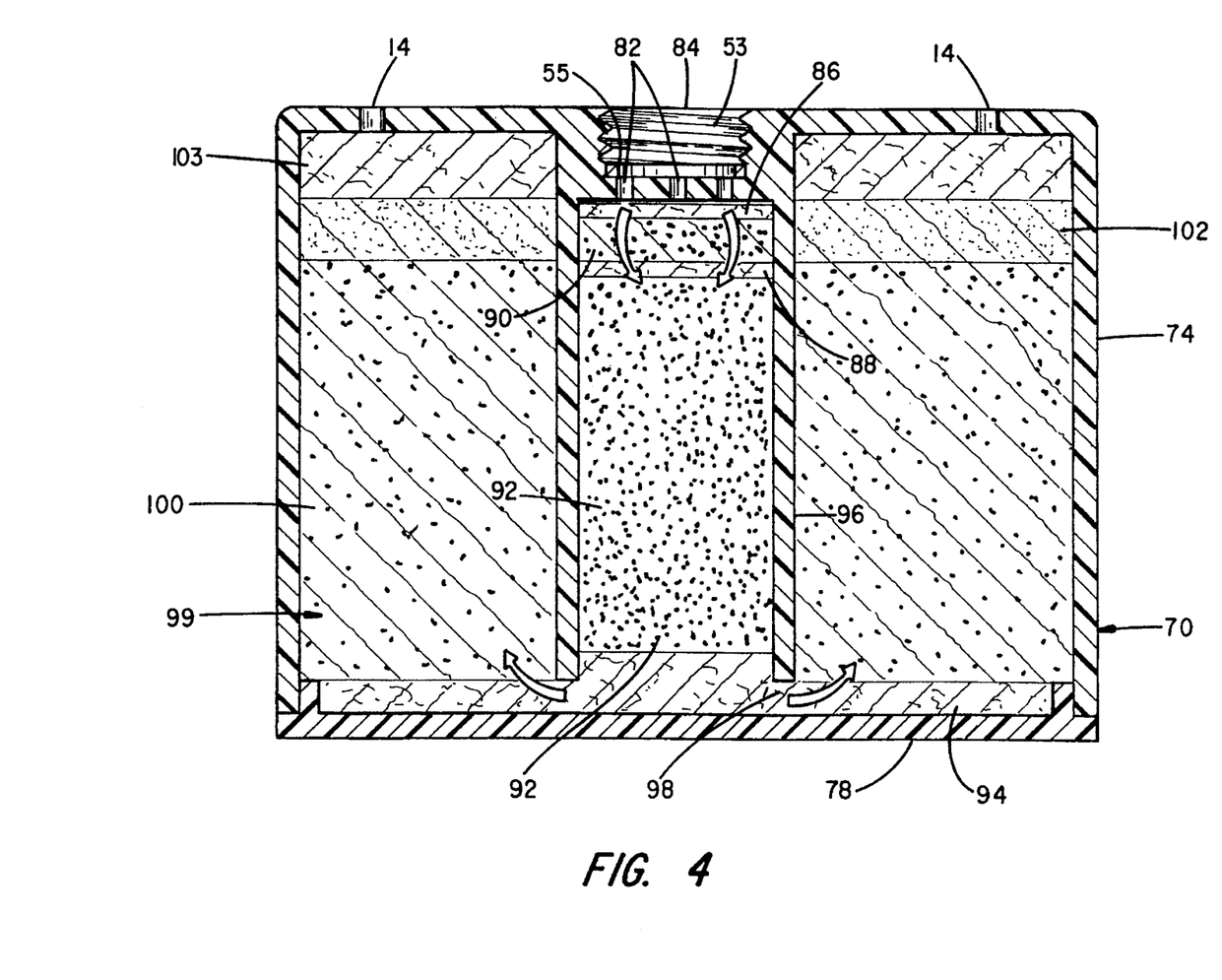
FIG. 4 is a cross section drawing of a treatment cartridge containing two concentric and adjoining purification media chambers.

The purification cartridge 70 is shown in detail at FIG. 4. The bore 84 includes porous spacers 86 and 88 which separate a bed of GAC media 90 from a bed of halogen media 92. A porous spacer 94 mounts to the lower end of the bore 84 and retains the media 92 within the bore 84. The spacer 94 mounts in a gap 98 between internal sidewalls 96, that define the bore 84, and the bottom cover 78.

The spacers 82, 84 and 94 are die cut from a fibrous material, such as a felt batting, to a nominal porosity in the range of 90 to 110 microns. The GAC bed 90 provides approximately 10 ml of material and is selected to exhibit a nominal porosity of 8×32 to 20×50 mesh. The halogen media bed 92 provides approximately 20 ml of a multi-valent iodine resin, for example, either an $I^3$ or $I^5$ resin or a mixture of such materials.

The spacer 94 separates the active halogen media 92 a concentrically adjoining media chamber 99. The chamber 99 contains a second bed of GAC media 100, a bed of a halogen scavenger media 102 and a fiber spacer 103. The GAC bed 100 provides approximately 100 to 150 ml of material and is selected to exhibit a nominal porosity of 8×32 to 20×50 mesh. The scavenger media bed 102 provides approximately 50 ml of material and is selected to scavenge residual iodine from the treated water to prevent an iodine after taste. The quantities of media 100 and 102 are presently selected to accommodate a nominal cartridge life of 150 to 400 gallons of water.

Figure 5:
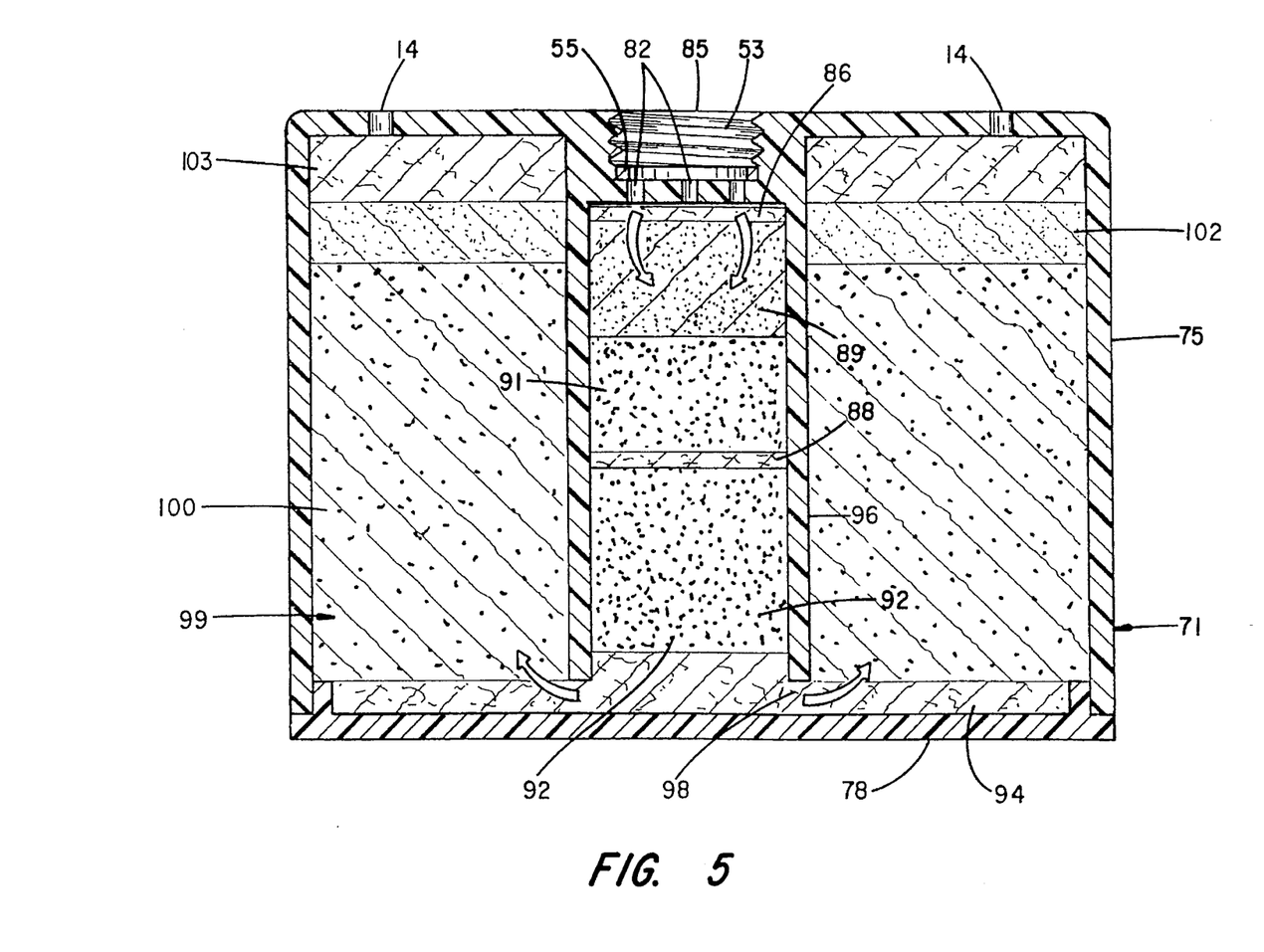
FIG. 5 is a cross section drawing of an alternative treatment cartridge containing two concentric and adjoining purification media chambers and including a bacteriostatic media.

The purification cartridge 71 at FIG. 5 is essentially the same as the cartridge 70. Corresponding parts of the housing 76 are similarly numbered. The principal difference is that the bore 85 includes a bacteriostatic media 89 in combination with a GAC media 91 and halogen media 92. The bacteriostatic media is sold under the brand name KDF and is used to dechlorinate the percolated water, remove metals and prevent growth of fungus, algae and mold within the cartridge 70. The material is described further in U.S. Pat. Nos. 4,642,192; 5,122,274; and 5,135,654.

Approximately 10 ml each of KDF 90, GAC 91 and halogen media 92 are provided at the bore 85. Comparable amounts to the cartridge 70 of GAC 100 and scavenger media 102 are provided at the chamber 99.

Bacteriostatic media 89 can be provided adjacent to both the inlet and outlet ports 82, 14 to prevent reverse migration of pathogens into the cartridge. The media 89 and 118 together prevent any growth of pathogens within the cartridge 72.

Figure 6:
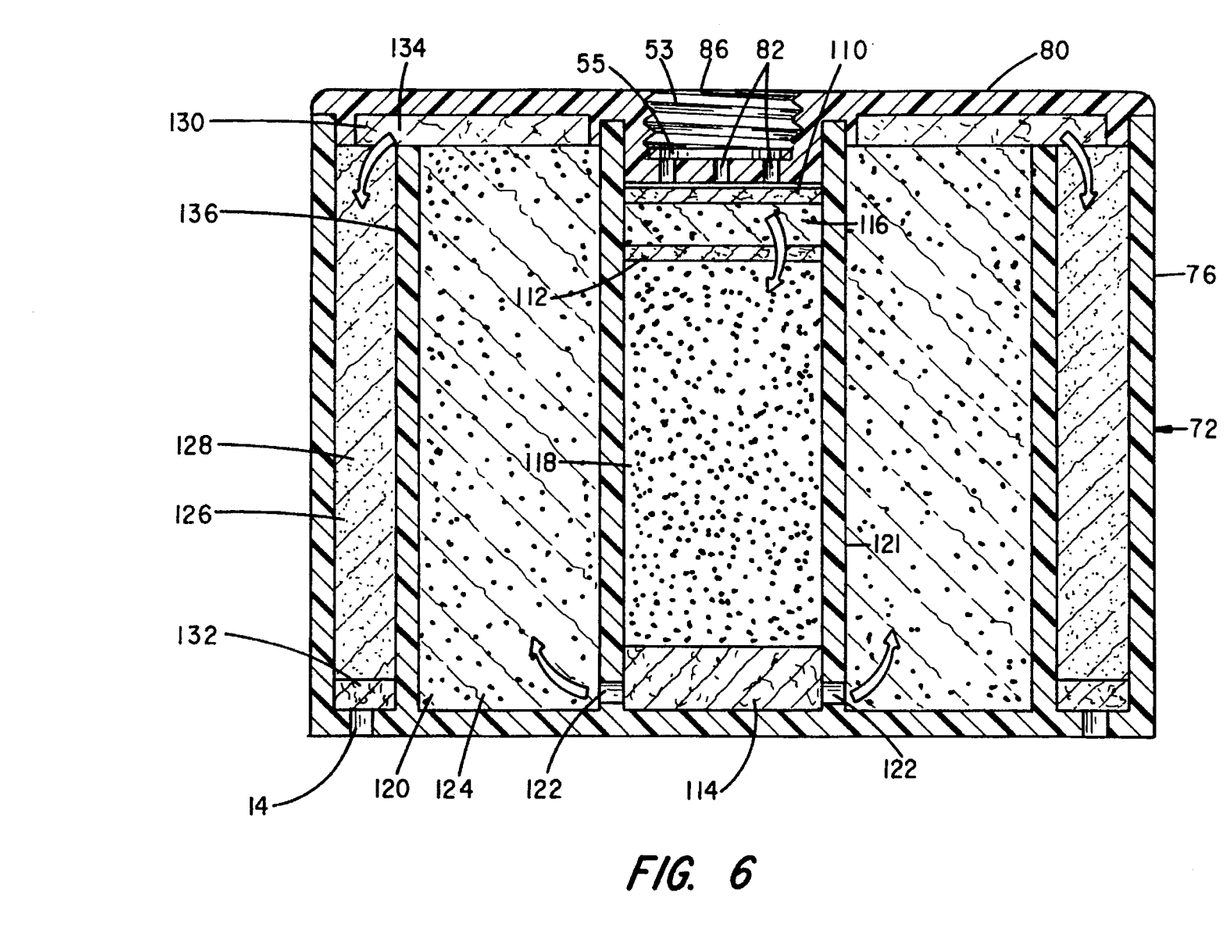
FIG. 6 is a cross section drawing of an alternative treatment cartridge containing three concentric and adjoining media chambers.

The purification cartridge 72 at FIG. 6 is also very similar to the cartridge 70. The bore 86 includes fiber spacers 110, 112 and 114, which separate a bed of GAC media 116 from a bed of an active halogen media 118. The bottom spacer 114 also separates the media 118 from an adjoining media chamber 120 at a series of radially directed ports 122 which are exposed through the sidewalls 121 that define the bore 86 and the chamber 120. The chamber 120 includes a quantity of a GAC media 124.

A third media chamber 126 concentrically adjoins the chamber 122 and contains a quantity of a halogen scavenger media 128. Porous spacers 130 and 132 separate the media beds 124 and 128 from one another and the outlet ports 14 at the bottom of the housing 76. The spacer 130 mounts in a gap 134 that extends between a second internal sidewall 136 of the chamber 120 and the cover 80.

The spacers 110, 112, 114, 130 and 132 are die cut from a fibrous material, such as a felt batting to a nominal porosity in the range of 90 to 110 microns. The GAC bed 116 provides approximately 10 ml of material and is selected to exhibit a nominal porosity of 8×32 to 20×50 mesh. The bed of halogen purification media 118 provides approximately 20 ml of a multi-valent iodine resin, for example, either an $I^3$ or $I^5$ resin or a mixture of such materials. The GAC bed 124 provides approximately 150 ml of material and is selected to exhibit a nominal porosity of 8×32 to 20×50 mesh. The bed of halogen scavenger media 128 provides approximately 50 ml of material and is selected to scavenge residual iodine from the treated water. The quantities of media 116, 118, 124 and 128 are presently selected at the cartridge 72 to accommodate a nominal cartridge life of 150 to 400 gallons of water. A bacteriostatic media 89 might also be added to the cartridge adjacent to either or both of the inlet and outlet ports 82, 14.

Figure 7:
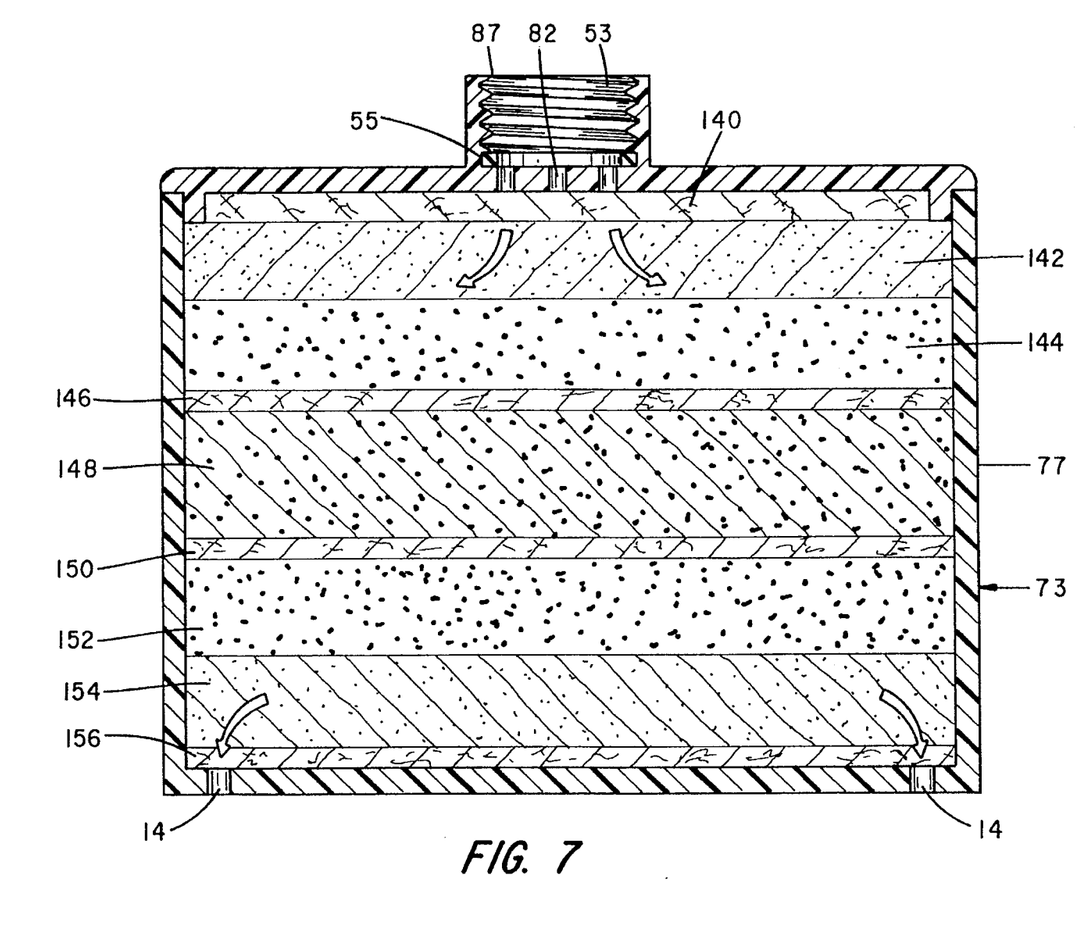
FIG. 7 is a cross section drawing of a treatment cartridge containing sequential treatment media beds.

In contrast to the above concentric media beds, the cartridge 73 of FIG. 7 includes a series of axially aligned media beds and spacers. A fiber spacer 142 mounts adjacent the inlet ports 82 of the bore 87. Separate beds of a bacteriostatic media 142 and a GAC media 144 mount between the spacer 142 and a spacer 146. A halogen based media, for example, a multi-valent iodine resin, mounts between the spacer 146 and a spacer 150. Quantities of a second GAC media 152 and halogen scavenger media 154 are retained between the spacer 150 and a spacer 156 at the outlet ports 14.

Depending upon the characteristics of the treatment water, the purifier cartridges 12, 70, 71, 72 and 73 can contain a variety of filtration, bacteriostatic and purification media. The filtration and bacteriostatic media can comprise GAC, porous fiber materials, KDF, or various other known filtrates and bacteriostatic media. The filtrates and bacteriostatic media can be admixed with preferred additives to remove undesired materials, either suspended or chemically bound within the water, and to maintain a pathogen free treatment system.

The bactericide halogen media 92, 118 and 148 preferably treats the filtered water as it is discharged from the filtration chamber 6 to devitalize or kill any contained parasites, bacterial and viral pathogens and/or remove any residual contaminants that pass through the purification cartridges. The presently provided multi-valent iodine medias (e.g. $I^3$ or $I^5$) have proven effective to remove numerous pathogenic contaminants. Other halogen based media available in a variety of forms (e.g. granular particulate or resin) may comprise a multi-valent iodine with bromide, a bromide derivative media, quaternary ammonium-silver-chlorine-bromine-bromide bearing medias, other halogen resins or halogen derivatives. As permitted by the media (i.e. chemically inert relative to one another), the treatment media may be provided in separate beds or admixed.

The scavenger media 102 and 128 may comprise a variety of materials. For example, fine mesh GAC, silver composites, starch, anion resins, cation resins and other halogen scavenger media capable of removing any free ions which might be released to the water can be used. Although a halogen scavenger media is preferrably included at each purification cartridge, such media can be deleted as desired.

The physical dimensions of the cartridges 70 and 72 can also be varied as desired to accommodate differing concentrations of filtration and purification media and thereby the working life and volume of water purified. As presently constructed, the housings 74 and 76 provide a nominal diameter in the range of 3.0 to 3.5 inches and a length in the range of 2 to 3 inches. Such cartridges are sufficient to treat the mentioned 150 to 400 gallon volumes of water, and which is believed suitable for the intended household application.

While the invention has been described with respect to various presently preferred constructions and considered modifications and improvements, still other constructions may be suggested to those skilled in the art. The scope of the invention should therefore be broadly construed within the spirit and scope of the following appended claims.

What is claimed is:

1. Purification apparatus comprising:

a) a storage container having a first liquid storage chamber;

b) a treatment container having a second liquid storage chamber, wherein said treatment container is supported to a rim of the storage container, wherein said treatment container mounts within said storage container, and wherein said treatment container has a nozzle having an aperture which communicates with said first liquid storage chamber;

c) a filter cartridge disposed within said treatment container and having a first housing that contains a filtrate media, wherein the first housing has a nozzle that contains a bore, said nozzle of said first housing including means for retaining and sealing said first housing to the nozzle of the treatment container;

d) a purification cartridge disposed below said filter cartridge and having a second housing which includes a plurality of outlet ports; said second housing having a bore coupled to the nozzle of said treatment container, and said bore of said second housing a plurality of inlet ports and further containing a first granular activated carbon (GAC) media and a halogen media; wherein said bore of said second housing communicates with a first chamber mounted concentric to said bore of said second housing, said first chamber containing a second GAC media and a halogen scavenger media; wherein a plurality of porous spacers separate said first and second GAC and halogen media from one another and said plurality of inlet and outlet ports, whereby liquid percolates through said plurality of inlet and outlet ports to said storage chamber; and e) means for drawing treated liquid from said storage container.

2. Apparatus as set forth in claim 1 wherein said halogen media comprises a material selected from a class consisting of a multi-valent iodine resin, multi-valent iodine resin with bromide, a bromide derivative particulate, and media bearing quaternary ammonium, silver, chlorine, bromine, or bromide moieties or combinations of said moieties.

3. Purification apparatus comprising:
   a) a storage container having a first liquid storage chamber;
   b) a treatment container having a second liquid storage chamber, wherein said treatment container is supported to a rim of the storage container, wherein said treatment container mounts within said storage container, and wherein said treatment container has a nozzle having an aperture which communicates;
   c) a filter cartridge disposed within said treatment container and having a first housing that contains a filtrate media, wherein the first housing has a nozzle that contains a bore, said nozzle of said first housing including means for retaining and sealing said first housing to the nozzle of the treatment container;
   d) a purification cartridge disposed below said filter cartridge and having a second housing which includes a plurality of outlet ports; said second housing having a bore coupled to the nozzle of said treatment container, said bore of said second housing having a plurality of inlet ports and further containing a first granular activated carbon (GAC) media and a halogen media; wherein said bore of said second housing communicates with a first chamber mounted concentric to said bore of said second housing, said first chamber containing a second GAC media and a halogen scavenger media; wherein a second chamber is mounted concentric to the first chamber and contains a halogen scavenger media, and wherein said plurality of outlet ports communicate with said second chamber, and wherein spacer means separate said first and second GAC and halogen media from one another and from said plurality of inlet and outlet ports, whereby liquid percolates through said plurality of inlet and outlet ports to said first liquid storage chamber; and
   e) draw down means for drawing treated water from said storage container.

4. Apparatus as set forth in claim 3 wherein said second housing further contains a bacteriostatic media disposed adjacent to either or both of said plurality of inlet and outlet ports.

5. Purification apparatus comprising:
   a) a storage container having a first liquid storage chamber;
   b) a treatment container having a second liquid storage chamber, wherein said treatment container is supported to a rim of the storage container, wherein said treatment container mounts within said storage container, and wherein said treatment container has a nozzle having an aperture which communicates with said first liquid storage chamber;
   c) a filter cartridge disposed within said treatment container and having a first housing that contains a filtrate media, said first housing having nozzle that contains a bore, and wherein the nozzle of the filter cartridge is telescopically received within the nozzle of said treatment container;
   d) a purification cartridge disposed below said filter cartridge and having a second housing which includes a plurality of outlet ports; said second housing having a bore coupled the nozzle of said treatment container, said bore of said second housing having a plurality of inlet ports and further containing a first granular activated carbon (GAC) media and a multi-valent iodine media; wherein said bore of said second housing communicates with a first chamber mounted concentric to said bore of said second housing, said first chamber containing second GAC media and a halogen scavenger media; wherein spacer means separate said first and second GAC and multi-valent iodine media from one another and from said plurality of inlet and outlet ports, whereby liquid percolates through said plurality of inlet and outlet ports to said first liquid storage chamber; and
   e) draw down means for drawing treated liquid from said storage container.

6. Apparatus as set forth in claim 5 wherein said filtrate media comprises a fan folded paper media, said paper media being secured between first and second end caps and wherein one of said end caps includes said nozzle of said first housing and seal means fitted to said nozzle of said first housing.

7. Apparatus as set forth in claim 5 wherein said purification cartridge further includes a bacteriostatic media mounted adjacent to either or both of said plurality of inlet and outlet ports.

8. Apparatus as set forth in claim 5 wherein said purification cartridge includes a second chamber mounted concentric to the first chamber and containing a halogen scavenger media, and wherein said plurality of outlet ports communicates with said second chamber, whereby water percolates from said plurality of inlet ports and through said first and second chambers and said plurality of outlet ports to said first liquid storage chamber.

9. Apparatus as set forth in claim 5 including means for venting said storage and treatment containers.

10. Apparatus as set forth in claim 9 wherein said rim of said storage container is defined by an open peripheral edge, said storage container further including and a removable cover, wherein said treatment container is supported to the edge at a flange having a plurality of protrusions which define a plurality of air gaps between said cover, said edge and said treatment container.

11. Apparatus as set forth in claim 10 wherein said venting means includes a plurality of vent holes in said treatment container.

12. Apparatus as set forth in claim 10 including a pedestal for supporting said storage container above a support surface.

13. Apparatus as set forth in claim 12 wherein said draw down means comprises a spigot having a depressible control valve.

14. Purification apparatus comprising:
   a) a storage container having a first liquid storage chamber;
   b) a treatment container having a second liquid storage chamber, wherein said treatment container is supported to a rim of the storage container, wherein said treatment container mounts within said storage container, wherein said treatment container includes means for venting the interior of said storage container, and wherein said treatment container has a nozzle having an aperture which communicates with said first liquid storage chamber;
   c) a filtrate cartridge disposed within said treatment container and comprising a first housing containing a folded filtrate media supported between first and second end caps, wherein one of said end caps includes a nozzle having a bore, wherein said nozzle of said first housing is telescopically received within the nozzle of the treatment container and includes means for retaining and sealing said first housing to the nozzle of the treatment container;

d) a purification cartridge disposed below said filtrate cartridge and having a second housing which includes a plurality of outlet ports; said second housing having a bore coupled to the nozzle of said treatment container, said bore of said second housing having a plurality of inlet ports and further containing a first granular activated carbon (GAC) media and a halogen media; wherein said bore of said second housing communicates with a first chamber mounted concentric to said bore of said second housing, said first chamber containing a second GAC media and a halogen scavenger media; wherein spacer means separate said first and second GAC and halogen media from one another and from said plurality of inlet and outlet ports, whereby liquid percolates through said plurality of inlet and outlet ports to said first liquid storage chamber; and e) draw down means for drawing treated water from said storage container.

15. Apparatus as set forth in claim 14 wherein said halogen media comprises a material selected from a class consisting of a multi-valent iodine resin, multi-valent iodine resin with bromide, a bromide derivative particulate, and media bearing quaternary ammonium, silver, chlorine, bromine, or bromide moieties or combinations of said moieties.

16. Apparatus as set forth in claim 14 wherein said halogen scavenger media comprises a material selected from a class consisting of fine mesh GAC, silver composites, starch, anion resins, cation resins and other halogen scavenger media.

* * * * *